(12) United States Patent
Zwack

(10) Patent No.: US 7,436,847 B2
(45) Date of Patent: Oct. 14, 2008

(54) METHOD FOR INTERNET-PROTOCOL-BASED TRANSMISSION OF COMMUNICATION DATA

(75) Inventor: Eduard Zwack, Puchheim (DE)

(73) Assignee: Siemens Aktiengesellschaft, Munich (DE)

( * ) Notice: Subject to any disclaimer, the term of this patent is extended or adjusted under 35 U.S.C. 154(b) by 1071 days.

(21) Appl. No.: 10/183,043

(22) Filed: Jun. 27, 2002

(65) Prior Publication Data

US 2003/0002520 A1    Jan. 2, 2003

(30) Foreign Application Priority Data

Jun. 27, 2001    (DE) ................. 101 30 926

(51) Int. Cl.
*H04B 7/212*    (2006.01)
(52) U.S. Cl. ...................... 370/442; 370/458
(58) Field of Classification Search ............... 370/458, 370/389, 442
See application file for complete search history.

(56) References Cited

U.S. PATENT DOCUMENTS

| | | | | |
|---|---|---|---|---|
| 4,736,371 A * | 4/1988 | Tejima et al. | ............... | 370/236 |
| 5,570,355 A * | 10/1996 | Dail et al. | ............... | 370/352 |
| 5,935,214 A * | 8/1999 | Stiegler et al. | ............... | 709/238 |
| 6,181,947 B1 * | 1/2001 | Du et al. | ............... | 455/509 |
| 6,526,070 B1 * | 2/2003 | Bernath et al. | ............... | 370/509 |
| 6,698,022 B1 * | 2/2004 | Wu | ............... | 725/111 |
| 2003/0002483 A1 * | 1/2003 | Zwack | ............... | 370/352 |
| 2003/0067918 A1 * | 4/2003 | DeMars | ............... | 370/392 |
| 2004/0177162 A1 * | 9/2004 | Wetzel et al. | ............... | 709/248 |

FOREIGN PATENT DOCUMENTS

| | | |
|---|---|---|
| DE | 196 42 258 C | 3/1998 |
| DE | 197 08 182 A | 9/1998 |
| EP | 1 039 686 | 9/2000 |
| WO | 01/35587 A1 | 5/2001 |

OTHER PUBLICATIONS

Schulzrinne et al., "RTP: A Transport Protocol for Real-Time Applications", Network Working Group Request for Comments 1889, Jan. 1996, pp. 1-75.
Cobb et al., "Time-Shift Scheduling-Fair Scheduling of Flows in High-Speed Networks", IEEE Transactions on Networking, vol. 6, No. 3, Jun. 1998, pp. 274-285.
Sreenan et al., "Internet Stream Synchronization using Concord", SPIE, vol. 2667, Jul. 1996, pp. 352-359.

\* cited by examiner

*Primary Examiner*—Hassan Kizou
*Assistant Examiner*—Bo Hui A Zhu
(74) *Attorney, Agent, or Firm*—Staas & Halsey LLP

(57) ABSTRACT

In a communication data stream transmitted within IP datagrams via a communication network, the timing of the transmission of the IP datagrams is oriented toward a timestamp which is transmitted to a transmitter of the IP datagrams. In this context, the transmitter reserves time intervals whose timing is geared to the received timestamp for the purpose of transmitting the IP datagrams. The IP datagrams are respectively assigned to one of the time intervals and are transmitted within the respectively associated time interval by the transmitter in line with the Internet protocol.

9 Claims, 2 Drawing Sheets

METHOD FOR INTERNET-PROTOCOL-BASED TRANSMISSION OF COMMUNICATION DATA

CROSS REFERENCE TO RELATED APPLICATIONS

This application is based on and hereby claims priority to German Application No. 10130926.0 filed on Jun. 27, 2001, the contents of which are hereby incorporated by reference.

BACKGROUND OF THE INVENTION

The invention relates to a method for Internet-protocol-based transmission, particularly real-time transmission, of communication data, such as voice, video or multimedia data.

In contemporary communication systems, many types of data are transmitted between data processing devices using the "Internet protocol"—IP for short. With the Internet protocol, data to be transmitted are divided up into data packets which, having each been provided with a destination address identifying a transmission destination, are transmitted to the transmission destination independently of one another. Such data packets are frequently also referred to as Internet protocol datagrams or IP datagrams.

On account of its widespread international use and on account of very low data transmission costs, the Internet protocol is also becoming increasingly important for real-time transmission of communication data. Since the Internet protocol was not designed with a view to real-time applications, however, it has one or two disadvantageous properties for real-time applications. Thus, by way of example, because the Internet protocol datagrams are transmitted independently of one another, the transmission times for the Internet protocol datagrams can fluctuate greatly. In addition, the asynchronous transmission of the Internet protocol datagrams, particularly when there is a high transmission load, means that packet collisions arise which result in delay or in entire Internet protocol datagrams being rejected.

To compensate for transmission time fluctuations, Internet protocol datagrams arriving at a receiver are normally buffer-stored in a buffer, from which they are read at constant time periods. However, buffering the Internet protocol datagrams causes further delay which cannot be tolerated in the case of many real-time applications.

SUMMARY OF THE INVENTION

It is an object of the present invention to specify a method for Internet-protocol-based transmission, particularly real-time transmission, of communication data which prevents transmission time fluctuations.

This object is achieved by a method involving a communication data stream, such as a voice, video or multimedia data stream, being transmitted within Internet protocol datagrams via a communication network. In this case, the timing of the transmission is oriented toward a timestamp which is transmitted to a transmitter of the Internet protocol datagrams. Transmission of the timestamp, which can be in the form of a time pulse or in the form of time information, for example, is preferably repeated at regular time periods. The transmitter uses the received timestamp to reserve time intervals, or groups of time intervals, whose timing is geared to this timestamp for the purpose of transmitting the Internet protocol datagrams. The Internet protocol datagrams are respectively assigned to one of the time intervals and are transmitted within the respectively associated time interval by the transmitter in line with the Internet protocol.

The transmitter of the Internet protocol datagrams can, by way of example, be an IP telephone, an IP videophone, a personal computer or an IP application program.

The individual time intervals or groups of time intervals can, to a certain extent, be regarded as different transmission channels. The explicit association of Internet protocol datagrams which are to be transmitted and transmission time intervals allows the number of datagram collisions in the communication network to be reduced considerably, which significantly reduces transmission time fluctuations for the Internet protocol datagrams. This makes it possible to provide smaller datagram buffers or frequently even to dispense with such buffers completely, which in turn significantly shortens the transmission time for the Internet protocol datagrams.

Another advantage of the present invention is that a method according to the present invention can be implemented in existing Internet protocol communication networks without substantial complexity. To receive the Internet protocol datagrams sent according to the present invention, no modifications are required on a conventional receiver of Internet protocol datagrams. The present invention can thus be used with backward compatibility.

In addition, it is easy to implement load control for the data traffic.

In accordance with one advantageous embodiment of the invention, the timestamp can be transmitted to the transmitter via the communication network by a central timestamp source, such as a router device or a server. The timestamp can preferably be transmitted on the physical layer (layer 1) of the OSI reference model. Advantageously, the timestamp can be transmitted to a plurality of or all transmitters of Internet protocol datagrams in the communication network or in one of the subregions thereof by a central timestamp source. The transmitters receiving a timestamp can be synchronized with one another by the timestamp, as a result of which the timings of the time intervals to be reserved according to the invention in the respective transmitters are geared to one another precisely. Transmission of the timestamp makes it possible to dispense with more complex protocols, such as the "NTP protocol" (NTP: Network Time Protocol), for synchronizing the transmitters.

In accordance with another advantageous embodiment of the invention, the time intervals can be reserved at regular, preferably virtually constant, time periods.

In accordance with one advantageous development of the invention, the transmitter can ascertain which of the time intervals are not being used for data transmission by other transmitters in the communication network. The Internet protocol datagrams to be transmitted are then assigned only to these time intervals not used elsewhere and are transmitted within these time intervals. This allows effective prevention of collisions between the Internet protocol datagrams and Internet protocol datagrams which are to be transmitted by other transmitters. In particular, it is possible to prevent forwarding network devices in the communication network, such as router devices or "hubs", from encountering Internet protocol datagrams which overlap in time and for whose forwarding only a single line is available.

Those time intervals which are not being used for data transmission by other transmitters in the communication network can be ascertained, by way of example, on the basis of reception of an association information item which assigns reservable time intervals to the transmitters. As an alternative to this, the transmitter can ask the other transmitters for unused time intervals or can negotiate splitting of the time intervals with the other transmitters. In accordance with another variant, the transmitter can also monitor the datagram traffic in the communication network and can in this way ascertain free, reservable time intervals.

In accordance with one advantageous embodiment of the invention, other Internet protocol datagrams—particularly for transporting non-real-time data—outside the reserved time intervals are transmitted asynchronously, that is to say without prescribing a precise transmission time. The total available data transmission time is thus split, by reserving the time intervals, to a certain extent into a reserved, synchronous part for transmitting the communication data stream and an asynchronous part outside the reserved time intervals for transmitting non-real-time data, for example control or signaling data.

Preferably, reserved and unreserved time intervals can alternate at prescribed time periods.

The share of the time intervals to be reserved in the total available data transmission time can be varied according to requirements, for example depending on the share of real-time data in the total data transmission volume.

In particular, a time split information item prescribing the share of the time intervals to be reserved can be transmitted to the transmitter with the timestamp.

In accordance with another advantageous development of the invention, initialization, e.g. of the transmitter, of a receiver or of another network device in the communication network, can involve increasing the share of the time intervals to be reserved starting from zero. This means that, to begin with, no time intervals are reserved and hence all data to be transmitted are initially transmitted asynchronously. In this phase, data transmission is based entirely on the conventional, asynchronous Internet protocol. A transmitter of Internet protocol datagrams in accordance with the invention can thus first ascertain whether a method according to the present invention is supported in the communication network, and if it is, can start to reserve time intervals. If, by contrast, the transmitter does not identify any support, for example because no timestamp is received, the transmitter can dispense with reserving time intervals. This means that a transmitter in accordance with the invention can also be integrated with backward compatibility into conventional communication networks.

In accordance with another advantageous development of the invention, the transmitter can reserve a further time interval whose timing is geared to the received timestamp, or a further succession of time intervals, for a further communication protocol. The further communication protocol implemented can preferably be a relatively simple protocol which requires less control and administration data to be transmitted with the user data than in the case of the Internet protocol. In particular, the further communication protocol can involve expressing an address, control or channel information item using the relative position of a data packet in the further time interval.

An exemplary embodiment of the invention is explained in more detail below with reference to the drawing.

In the drawing, in each case in a schematic illustration:

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
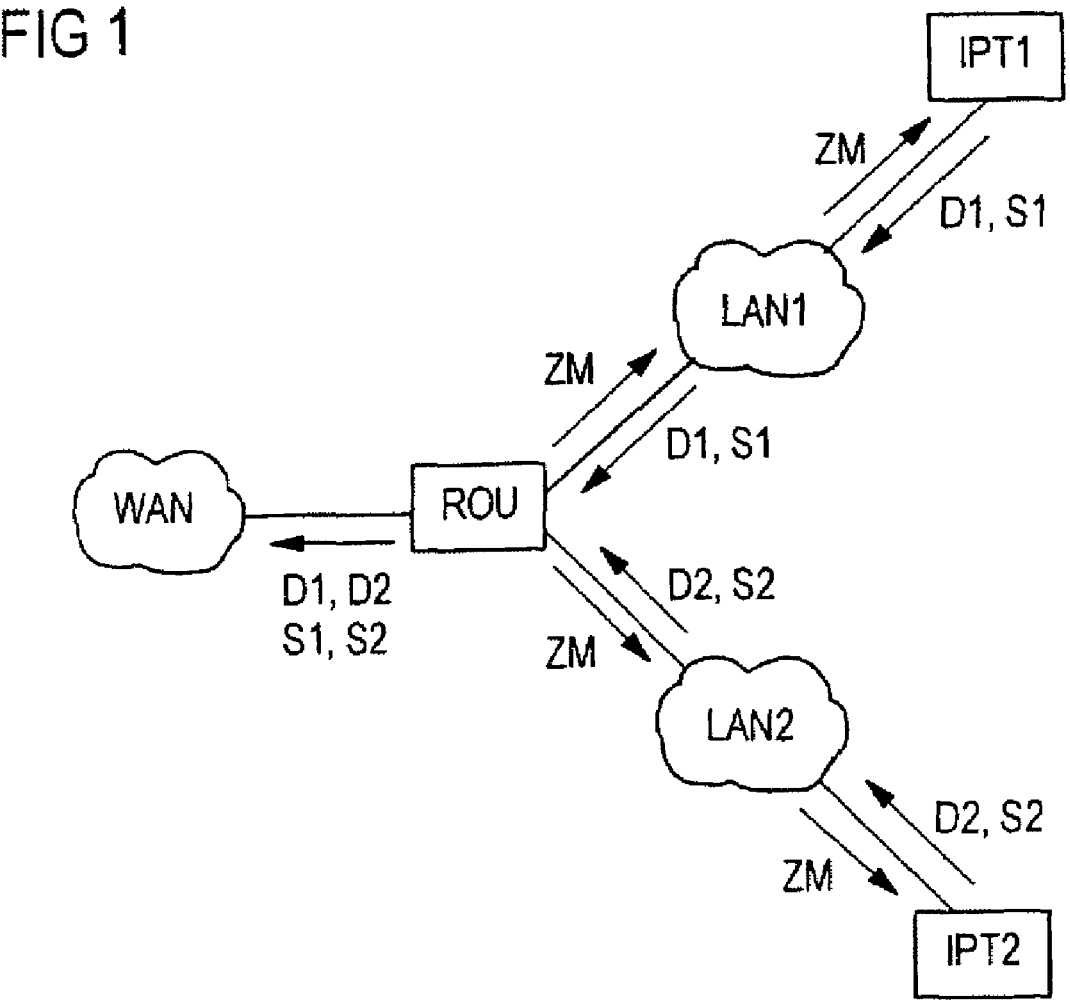
FIG. 1 shows an Internet-protocol-based communication network for real-time transmission of communication data streams.

Reference will now be made in detail to the preferred embodiments of the present invention, examples of which are illustrated in the accompanying drawings, wherein like reference numerals refer to like elements throughout.

FIG. 1 is a schematic illustration of an Internet-protocol-based communication network comprising a local area network LAN1, a local area network LAN2 and a wide area network WAN, such as the Internet, as subnetworks. The subnetworks LAN1, LAN2 and WAN are coupled to one another via a router device ROU which is used to switch Internet protocol datagrams, called IP datagrams below, between the individual subnetworks LAN1, LAN2 and WAN.

In addition, an Internet-protocol-based communication terminal IPT1 is coupled to the local area network LAN1, and an Internet-protocol-based communication terminal IPT2 is coupled to the local area network LAN2. The communication terminals IPT1 and IPT2 can, by way of example, be in the form of IP telephones, IP videophones, personal computers or any other transmitters of communication data.

The present invention involves the router device ROU transmitting a timestamp ZM via the local area network LAN1 to the communication terminal IPT1 and via the local area network LAN2 to the communication terminal IPT2. The timestamp ZM can, by way of example, be produced by a time pulse or a time statement. Preferably, the timestamp ZM is transmitted on the physical layer, that is to say layer 1 of the OSI reference model, in order to ensure particularly precise synchronization. The timestamp ZM can be used to synchronize the communication terminals IPT1 and IPT2 with one another by gearing the timing of their clock generators (not shown) or real-time clocks (not shown) to the received timestamp ZM. The received timestamp ZM can also additionally be used to display the time of day on a display on the communication terminal IPT1 or IPT2. It is thus possible to dispense with separate transmission of time information using a complex synchronization protocol, such as the NTP protocol (Network Time Protocol).

In accordance with one alternative embodiment of the invention, the timestamp ZM can be transmitted rather than by the router device ROU also by another network device, such as a "hub", a server, etc., centrally to the coupled communication terminals, in this case IPT1 and IPT2, or to any other network devices which need to be synchronized.

In the present exemplary embodiment, the communication terminals IPT1 and IPT2 transmit a respective communication data stream to the wide area network WAN in real time. Besides the respective communication data stream, which can comprise voice, video or multimedia data, for example, the communication terminals IPT1 and IPT2 also transmit non-real-time data, such as signaling, control or file data, to the wide area network WAN.

The communication data stream coming from the communication terminal IPT1 is transmitted within IP datagrams D1 which have been provided with a destination address and are transmitted to the wide area network WAN via the local area network LAN1 and the router device ROU. Correspondingly, the non-real-time data coming from the communication terminal IPT1 are transmitted to the wide area network WAN within IP datagrams S1, respectively provided with a destination address, via the local area network LAN1 and the router device ROU. In a similar manner, the communication data stream coming from the communication terminal IPT2 is transmitted within IP datagrams D2 and the non-real-time data coming from IPT2 are transmitted within IP datagrams S2 to the wide area network WAN via the local area network LAN2 and the router device ROU.

According to the invention, transmission of the IP datagrams D1, D2 containing real-time communication data is based on a prescribed time frame structure. The prescribed time frame structure means that IP datagrams containing real-time data are no longer transmitted asynchronously, as in conventional IP-based communication networks, but rather within time intervals reserved specifically for this purpose, that is to say synchronously to a certain extent.

Figure 2:
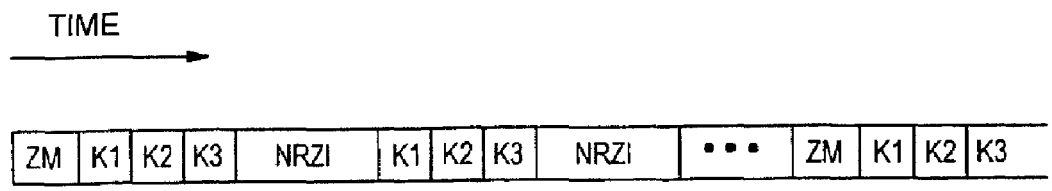
FIG. 2 shows a time frame structure for transmitting Internet protocol datagrams, and FIGS. 3a, 3b and 3c respectively show the timing of Internet protocol datagrams with respect to the time frame structure.

FIG. 2 shows an example of such a time frame structure in a schematic representation. The start of a respective time frame is marked by the reception of the timestamp ZM. Subsequently, reserved time intervals K1, K2, K3 and unreserved time intervals NRZI alternate until a timestamp ZM initiating the next time frame is received again. In the present exemplary embodiment, the timestamp ZM is first followed by three adjacent time intervals K1, K2 and K3 which have been reserved for IP datagrams containing real-time data. Immediately afterwards comes an unreserved time interval NRZI. The time interval group comprising three reserved time intervals K1, K2 and K3 and one unreserved time interval NRZI is then repeated at regular time periods until the next timestamp ZM is received. A standard value, which is advantageous for many applications, for the length of time of a time interval group is approximately 20 ms. Preferably, the boundary between reserved and unreserved time intervals is variable. For the purpose of continuously synchronizing the time frames of the communication terminals IPT1 and IPT2, the timestamps ZM are transmitted at regular, preferably virtually constant, time periods, for example of 1 s.

Preferably, the reserved time intervals K1, K2, K3 are associated with different transmission channels on the basis of their relative position in their respective time interval group. Thus, the time intervals K1 heading a respective time interval group form a first transmission channel, the time intervals K2 in second position form a second transmission channel, and the time intervals K3 in third place form a third transmission channel. The individual transmission channels can, to a certain extent, be regarded as time-division multiplex channels which, in accordance with the invention, have been embedded into the asynchronous concept of the Internet protocol.

In the text below, the transmission channels are respectively denoted by the same reference symbols as the respectively associated time intervals K1, K2 and K3, for reasons of clarity.

For real-time transmission of a communication data stream, one or more transmission channels K1, K2 and K3 are reserved for the communication data stream. To this end, each IP datagram in the communication data stream is exclusively assigned a respective time interval for the reserved transmission channel(s), within which time interval the respective IP datagram is transmitted. To transmit an IP datagram containing communication data precisely within its associated time interval, this IP datagram may need to be delayed up to the start of the associated time interval. The relative instant of transmission for an IP datagram within a time interval group can—provided that the reserved time intervals K1, K2, K3 are of the same length—be ascertained by multiplying the length of a time interval K1, K2, K3 by a transmission channel number starting at zero.

Figure 3A:
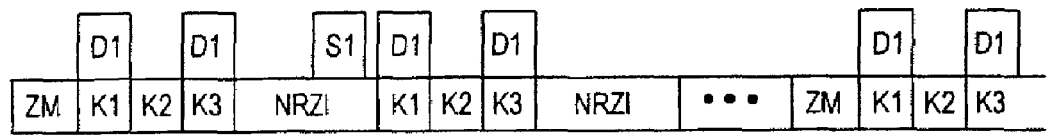

FIG. 3a is a schematic illustration showing the timing of the IP datagrams D1 and S1, coming from the communication terminal IPT1, with respect to the prescribed time frame structure. For transmitting the IP datagrams D1 containing the real-time data, the transmission channels K1 and K3 have been reserved, in which the IP datagrams D1 are transmitted to the router device ROU. For the IP datagrams S1 containing non-real-time data, no specific transmission channel has been reserved, which means that the IP datagram S1 is transmitted to the router device ROU within the unreserved time interval NRZI asynchronously.

Figure 3B:
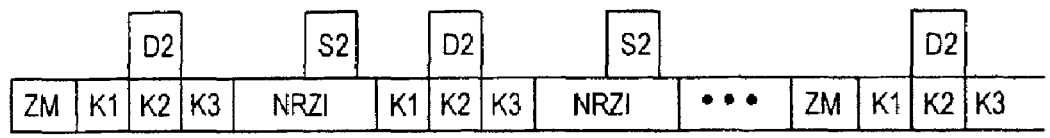

In a similar manner, FIG. 3b shows, schematically, the timing of the IP datagrams D2 and S2, coming from the communication terminal IPT2, with respect to the prescribed time frame structure. For the IP datagrams D2 containing real-time data, the second transmission channel, that is to say the time interval K2, has been reserved for transmission. By contrast, for the IP datagrams S2 containing non-real-time data, no specific time interval has been reserved, which means that the IP datagrams S2 are transmitted to the router device ROU within the unreserved time intervals NRZI. As indicated in FIG. 3b, the IP datagrams S2 are transmitted within the unreserved time intervals NRZI asynchronously, that is to say without particular timing relative to the time interval boundaries.

The association of the IP datagrams D1 and D2 with the nonoverlapping time intervals K1, K3 and K2 prevents the IP datagrams D1 and D2 which are to be forwarded to the wide area network WAN by the router device ROU via the same line from colliding with one another in terms of time. The result of a time collision between IP datagrams arriving at the router device ROU would be that at least one of these IP datagrams would be rejected or at least delayed until the forwarding line became free. However, this would result in delay time fluctuations which are difficult to foresee and which would have an adverse effect on the real-time response of the transmission.

The communication data streams are assigned to the transmission channels K1, K2, K3 such that only one of the communication terminals IPT1 and IPT2 ever transmits on a respective transmission channel K1, K2 or K3. Appropriate temporary reservation of a transmission channel K1, K2, K3 for a respective communication terminal, in this case IPT1 or IPT2, can be effected, by way of example, by transmitting a reservation or association information item to the communication terminals IPT1 and IPT2. The reservation or association information item can preferably be transmitted by a central network device. As an alternative to this, the communication terminals IPT1 and IPT2 can negotiate among one another—by interchanging appropriate messages—which transmission channels or time intervals are reserved or can be reserved by which communication terminal, in this case IPT1 or IPT2. In accordance with another embodiment of the method, a communication terminal IPT1 or IPT2 can ascertain a free transmission channel by observing the network data traffic itself.

The association of the IP datagrams D1 and D2 containing real-time data with nonoverlapping time intervals K1, K2, K3 prevents IP datagram collisions at least for real-time data streams. By contrast, it is entirely possible for the IP datagrams, in this case S1 and S2, transmitted asynchronously in the nonexclusively reserved time intervals NRZI to collide in the router device ROU.

Figure 3C:
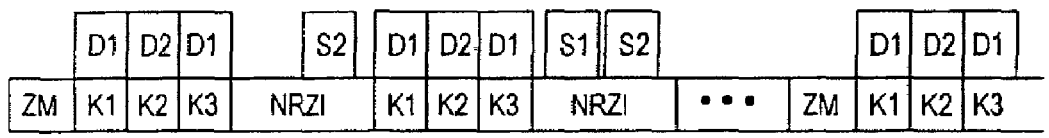

FIG. 3c is a schematic illustration showing the timing of the IP datagrams D1, D2, S1 and S2 forwarded to the wide area network WAN by the router device ROU with respect to the prescribed time frame structure. Since the IP datagrams D1, D2 have arrived at the router device ROU in reserved time intervals which do not overlap in terms of time, the router device ROU is able to forward the IP datagrams D1 and D2 to the wide area network WAN in the order and with the timing in/with which they arrived. The IP datagrams D1 and D2 can generally be forwarded to the wide area network WAN with little, but virtually constant, delay and, in particular, without substantial delay time fluctuations, caused by collision, in adjacent time intervals K1, K2, K3.

In accordance with one method variant, the router device ROU—or another network device—can convert IP datagrams arriving via particular transmission channels to other transmission channels, i.e. to other reserved time intervals, in order to forward them. Conversion can preferably be effected such that the resultant delays respectively have a virtually constant channel-specific value for each of the converted transmission channels.

Unlike the IP datagrams D1 and D2, in the present exemplary embodiment, the asynchronously transmitted IP datagram S1 arrives at the router device ROU virtually simultaneously in one of the asynchronously transmitted IP datagrams S2. For the purpose of forwarding to the wide area network WAN, one of these IP datagrams, in this case S1, therefore needs to be delayed by the router device ROU until the next transmission opportunity. In the present exemplary embodiment, the IP datagram S1 cannot be transmitted until in the unreserved time interval NRZI of the next time interval group. Since the IP datagram S1 contains non-real-time data, the delay which arises can generally be tolerated, however.

The splitting of the time frame into reserved time intervals K1, K2, K3 for synchronous transmission of real-time data and unreserved time intervals NRZI for asynchronous transmission of non-real-time data can advantageously be matched to the respectively current data transmission volume of real-time and non-real-time data. Thus, by way of example, if the transmission volume of the real-time data predominates, the share of the time intervals to be reserved in the total available data transmission time can be enlarged as appropriate. Similarly, for a small share of real-time data which are to be transmitted, the share of the time intervals to be reserved can be reduced as appropriate. To adjust the share of the time intervals to be reserved, it is possible to vary their number or their length, for example. The share of the time intervals to be reserved can, by way of example, be stipulated using a time split information item which can be transmitted with the timestamp ZM. If, in the extreme case, nothing but non-real-time data are to be transmitted, the total available data transmission time can be released for conventional asynchronous transmission of IP datagrams.

The reservation and assignment or allocation of the transmission time intervals for IP datagrams can preferably be implemented in the form of a novel "quality of service function" (QoS function) in the communication network.

On account of the reservation of time intervals for transmitting real-time data, a method according to the present invention, in contrast to conventional IP-based transmission methods, no longer allows a respective transmission time for IP datagrams to be selected arbitrarily, but rather limits the transmission time to prescribed time intervals, in this case K1, K2, K3 and NRZI. By contrast, a receiver of IP datagrams transmitted in accordance with the invention requires no implementation changes with respect to the conventional Internet protocol. Hence, communication devices, in this case IPT1 and IPT2, which transmit IP datagrams according to the present invention can also be operated in conventional, asynchronous IP-based communication networks.

The variable splitting of the total available data transmission time into reserved and unreserved time intervals permits simple initialization of a method according to the present invention which adjusts itself to suit different network environments: in this context, at the start of initialization, the transmitter operating according to the present invention initially reserves no time interval for transmitting real-time data, which means that the total data transmission time is initially available for conventional, asynchronous transmission. During this time, the transmitters, in this case IPT1 and IPT2, try to receive a timestamp ZM. If no such timestamp is received, no time intervals are reserved for transmitting real-time data. If, by contrast, such a timestamp ZM is received by a transmitter, the transmitter gears the timing of a time frame to the received timestamp ZM and reserves prescribable time intervals of the time frame, in accordance with the invention, for transmitting real-time data.

The invention has been described in detail with particular reference to preferred embodiments thereof and examples, but it will be understood that variations and modifications can be effected within the spirit and scope of the invention.

What is claimed is:

1. A method for transmitting a communication data stream within Internet protocol datagrams via a communication network, comprising:
    initializing transmission of Internet protocol datagrams by setting a share of time intervals to be reserved to zero;
    transmitting, to a transmitter of the Internet protocol datagrams, a timestamp and time split information prescribing the share of the time intervals to be reserved;
    reserving the time intervals at the transmitter with a timing geared to the timestamp for transmission of the Internet protocol datagrams to transport a communication data stream by increasing the share of the time intervals to be reserved after said initializing;
    assigning each of the Internet protocol datagrams to a corresponding time interval; and
    transmitting respective Internet protocol datagrams within the corresponding time interval by the transmitter in line with the Internet protocol.

2. The method as claimed in claim 1, further comprising transmitting the timestamp from a central timestamp source to the transmitter via the communication network.

3. The method as claimed in claim 2, further comprising deriving the time intervals from one of a clock generator and a real-time clock in the transmitter, the one of a clock generator and a real-time clock being synchronized by the timestamp.

4. The method as claimed in claim 3, wherein said reserving of the time intervals occurs at regular time periods.

5. The method as claimed in claim 4, further comprising ascertaining by the transmitter which of the time intervals are not being used for data transmission by another transmitter in the communication network, and wherein said assigning of the Internet protocol datagrams to the time intervals is performed only for the time intervals which are not used elsewhere.

6. The method as claimed in claim 5, further comprising asynchronously transmitting other Internet protocol datagrams outside the reserved time intervals.

7. The method as claimed in claim 6, further comprising varying the share of the time intervals to be reserved in a total available data transmission time according to requirements.

8. The method as claimed in claim 1, further comprising reserving in the transmitter a further time interval having timing is geared to the received timestamp for a further communication protocol.

9. The method as claimed in claim 8, wherein the timestamp is transmitted on a physical layer of an OSI reference model.

* * * * *